July 1, 1941.  J. E. RAYMOND  2,247,406
AIRCRAFT FUEL DISCHARGE
Filed June 26, 1939
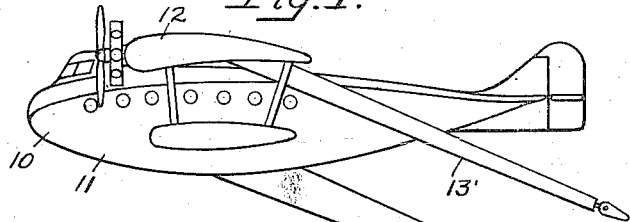
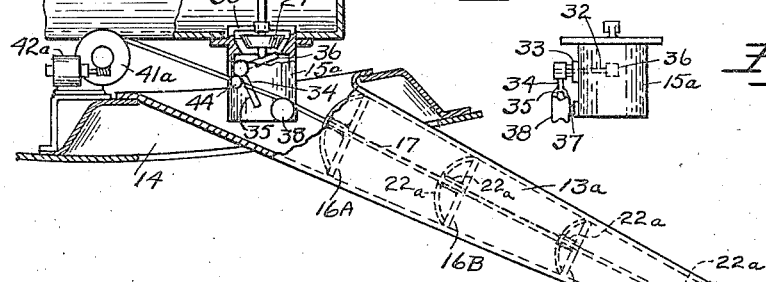
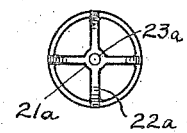
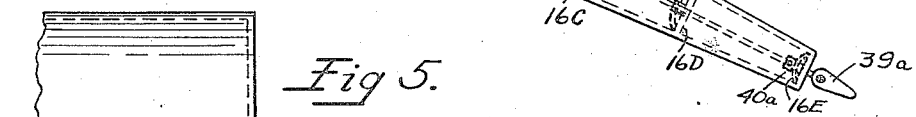
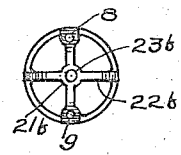
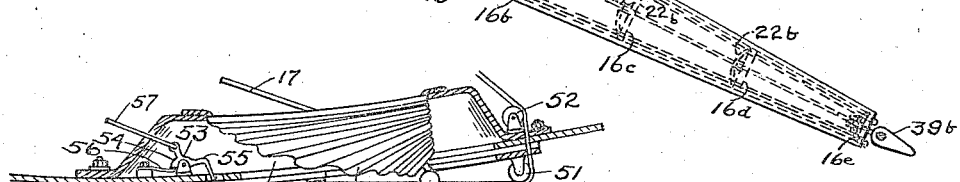
Inventor
Julian E. Raymond
By Adam Richmond
Attorney Patented July 1, 1941

2,247,406

UNITED STATES PATENT OFFICE 2,247,406

AIRCRAFT FUEL DISCHARGE

Julian E. Raymond, Washington, D. C.

Application June 26, 1939, Serial No. 281,198

6 Claims. (Cl. 244—135)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to aircraft, but more particularly to a device for rapidly discharging a quantity of fuel therefrom.

One object of the invention is to provide a device for rapidly lightening the weight of aircraft in case of emergency by discharging a quantity of gasoline from the fuel tanks.

Another object of the invention is to provide means for discharging inflammable fuel from aircraft in a manner to avoid the attendant fire hazards to the craft and its occupants.

A further object of the invention is to prevent explosions on aircraft in flight, when discharging inflammable fuel, by removing the discharge area of the fuel from the sparks or flames of the exhaust.

Still other objects and attendant advantages of the invention will be apparent from the following detailed description, taken in connection with the accompanying drawing in which like parts are designated by similar reference characters, and in which—

Fig. 1 illustrates an airplane in flight, equipped with conical discharge tubes, which are shown in extended position;

Fig. 2 is a side elevation of the fuel tank and extended discharge tube as located on the fuselage or wing of an airplane, partially broken away to expose a portion of the operating mechanism;

Fig. 3 is a front elevation of the outlet tube, which forms the lower portion of the discharge valve mechanism illustrated in Fig. 2;

Fig. 4 is an enlarged front elevation of a spreader ring as used in the discharge tube illustrated in Fig. 2;

Fig. 5 is a side elevation of the fuel tank and extended discharge tube similar to that illustrated in Fig. 2, but showing a modified form of the device;

Fig. 6 is an enlarged front elevation of a spreader ring as used in the discharge tube illustrated in Fig. 5; and Fig. 7 is a side elevation of the discharge tube in partially retracted position.

Briefly stated, the device for rapidly and safely discharging the fuel comprises a flexible tube which normally remains collapsed or telescoped beneath the discharge valve of airplane fuel tanks in such a manner as to permit the extension thereof at the will of the operator. The device is so constructed that the extension of the flexible discharge tube opens the fuel tank outlet valve and permits the discharge of fuel through the tube to the rear of the exhaust. Means are also provided for retracting the discharge tube, thereby closing the fuel tank outlet valve.

Referring to Fig. 1, the numeral 10 indicates an airplane, 11 the fuselage, and 12 one of the wings thereof. Within the fuselage and wings of the airplane as illustrated in Fig. 1, are contained fuel tanks as shown in Figs. 2 and 5, beneath which are located collapsible discharge tubes 13 and 13', shown in extended or operative position for permitting the rapid removal of fuel from the tanks.

The collapsible discharge tubes 13 and 13', which are constructed of a material of suitable tensile strength provided with an inner surface impervious to the action of the fuel to be discharged therethrough, are attached to the aircraft within a recess, as indicated at 14 in Figs. 2, 5 and 7, located directly below the fuel tank outlet tubes 15a and 15b.

The tubes 13 and 13' which are conical in form are extended laterally throughout their length by a plurality of evenly spaced concentric spreader rings which are of increasing diameter to fit corresponding sections of the tube to which they are attached. These rings are designated by the numerals 16A, 16B, 16C, 16D and 16E, on the tube shown in Fig. 2, and by the numerals 16a, 16b, 16c, 16d and 16e, in the modified form shown in Fig. 5.

The length of the tubes when extended is such as to permit the discharge of fuel into the air beyond the immediate proximity of the discharged gases of the motors. In the normal, or inoperative position, the discharge tube is telescoped or collapsed within the recess 14, and held in that position by either a central control cable 17 as illustrated in Fig. 2, lateral take-up cables 18 and 19 as shown in Fig. 5, or by a sliding door 20 which closes the compartment formed by the recess 14 as shown in Fig. 7, and which will be described further.

The spreader rings 16A, 16B, 16C, 16D and 16E, and 16a, 16b, 16c, 16d and 16e of the discharge tubes 13a and 13b illustrated in Figs. 2 and 5, respectively, are formed with a central hub 21a and 21b, and arcuately-shaped radiating spokes 22a and 22b constituting spiders, as shown in Figs. 2, 4, 5, and 6. The central openings 23a and 23b in the hubs of these spiders are for the passage of the control cable 17 and the control cable 24 of the tubes 13a and 13b, respectively.

It will be noted that in the spider of the ring shown in Fig. 6, that two of the spokes 22a are provided with openings 8 and 9. These holes are for the passage of the take-up cables 18 and 19 mentioned above. These cables after being passed through the holes are either knotted or provided with a collar to prevent their withdrawal.

The spiders of the spreader rings are formed with arcuately-shaped spokes to thus provide frames of spherical sector formation which fit one within the other. This construction is adapted to facilitate telescopic alignment of the spreaders when the tubes 13a and 13b are withdrawn from extended position and nested within the recess 14.

Referring to Fig. 2, which illustrates one form of valve release mechanism, it will be noted that the fuel tank 25 is provided with a valve mechanism which includes an upper and a lower poppet valve, designated by the numerals 26 and 27, respectively, which are attached to a central control rod 28 slidably mounted within centering brackets 29 and 30. The function of the upper valve is to admit air to the interior of the tank 25, and that of the lower to release fuel from the tank into the discharge tube 13a. The valves are retained in their normal closed position by means of a spring 31. The discharge outlet 15a, which is formed integral with the lower discharge valve 27 of the tank, is provided with an opening for the passage of a rotatable shaft 32 which is mounted in a flanged bearing 33 attached to the exterior of the tube. The exterior end of the shaft 32 is rigidly attached to a lever arm 34 which is provided with a slotted opening 35 for the passage of the control cable 17. The other end of the shaft 32 projects within the discharge outlet tube 15a, and is rigidly attached to another lever 36 which contracts the lower end of the rod 28 for actuating the poppet valves 26 and 27. Upon a shaft 37, which projects from the exterior of tube 15a, is rotatably mounted a grooved pulley wheel 38 as shown in Figs. 2 and 3.

To the lower end of the control cable 17 on the outer side of the spider ring 16E is attached a weight 38a and on the other side of the spider within the interior of the tube a collar 40a.

The cable 17 passes centrally through the interior of the tube over the pulley wheel 38, through the slotted opening 35 in lever 34 and is wound on the reel 41a of a power or manually operated winch 42a, the winch shown for this purpose in Fig. 1, being driven by an electric motor 43a, through suitable gearing.

The reel 41a of the winch 42a is released from the driving mechanism for the purpose of paying out the cable by means of a clutch, not shown in the illustration.

In the operation of this form of the device, the conical tube 13a is retained in collapsed position as shown in Fig. 7, by means of the central take-up cable 17 which is wrapped around the reel 41a of winch 42a. When it is desired to allow fuel to flow rapidly from the tank as in a case of emergency, the clutch (not shown) of the winch 42a is released and the cable 17 pays out from the reel by action of the weight 39a until the obstruction, comprising a collar or a centrally drilled ball 44 attached to the cable 17 contacts the lever 35, thereby turning the shaft 32 and causing the lever 36 to raise the valve rod 28, lifting the valve discs from their seats and allowing the fuel to pour out through the discharge tube 15a as the air enters valve 26. The fuel pours down the flexible tube 13a and out into the atmosphere at its end, which is held out and back of the exhaust of the engine by the inertia of the weight 39a and the surrounding air as the plane moves forward. When it is desired to stop the discharge of the gasoline the operator starts the reel of the winch to wind in the cable 17, the collar or obstruction 44 is thereby removed from the lever 34 and the lever 36 allows the valves to close, and as the cable is wound around the reel the conical tube 13a is drawn into the recess 14.

In the modified construction shown in Fig. 5, the central control cable 24 operates only the rotary valve of the outlet tube 15b, and the laterally spaced cables 18 and 19 withdraw the tube 13b from its extended position into the recess 14. The cable 18 passes over the idler pulley 46 and onto the reel 41b of the winch 42b, whereas the cable 19 passes directly to the reel of the winch. The release of the reel to cause unwinding of the cable in this modified form of the device is effected by a spring operated latch 47 which engages the teeth of the driving gear of the motor. The valve of the outlet tube 15b which is of the rotary type is also returned to closed position by means of a return spring 48.

In Fig. 7, which shows the conical tube in a partially retracted and collapsed condition, a means for enclosing the tube within the recess is shown. This means consists of a sliding door 20 mounted beneath the recess, which is closed against the action of a return spring 49 by pulling the cable 50 which passes over the idler pulley wheels 51 and 52. In order to open the sliding door 20 to release the discharge tube from the compartment or recess, a latch 53 is provided which can be released easily by the operator. This latch consists of a bell-crank lever 54 which is pivoted in the bracket 55, and which is held in engagement with the sliding door by means of a spring 56. When the latch 53 is released by pulling the bell-crank cord 57, spring 49 pulls back the sliding door 20 and thus releases the flexible discharge tube 13c.

In the above description several means are shown for releasing the flexible discharge tubes and for retracting the same from their extended operative position. However, this mechanism may be varied to suit the conditions relative to the design, and also changes may be made in the construction of the tube to fit particular requirements without departure from the scope and spirit of the invention.

Having described my invention, what I claim as new and wish to secure by Letters Patent is:

1. In combination with an airplane having a fuel tank, the latter including a fuel outlet, and a valve controlling said outlet; of means for discharging the fuel from the tank during flight, said means comprising a normally collapsed flexible fuel discharge tube carried by the airplane, means for releasing and retracting the tube during flight, means for causing said tube to assume a circumferentially and longitudinally extended fuel discharging position during flight, additional means in connection with said releasing and retracting means coacting with said valve, whereby movement of the tube to extended position opens said valve, and restoration of said tube to its normally collapsed condition causes said valve to close.

2. In combination with an airplane having a fuel tank, the latter including a fuel outlet, and a valve controlling said outlet; of means for discharging the fuel from the tank during flight, said means comprising a normally collapsed flexible fuel discharge tube carried by the airplane, means for releasing and retracting the tube during flight, means for causing said tube to assume a circumferentially and longitudinally extended fuel discharging position during flight, said means including a plurality of spreaders distributed longitudinally of the tube, and additional means in connection with said releasing and retracting means coacting with said valve, whereby movement of the tube to extended position opens said valve, and restoration of said tube to its normally collapsed condition causes said valve to close.

3. In combination with an airplane having a fuel tank, the latter including a fuel outlet, and a valve controlling said outlet; of means for discharging the fuel from the tank during flight, said means comprising a normally collapsed flexible fuel discharge tube carried by the airplane, means for releasing and retracting the tube during flight, means for causing said tube to assume a circumferentially and longitudinally extended fuel discharging position during flight, said means including a plurality of spreaders distributed longitudinally of the tube and a weight attached to the free end of said tube, additional means in connection with said releasing and retracting means coacting with said valve, whereby movement of the tube to extended position opens said valve and restoration of said tube to its normally collapsed condition causes said valve to close.

4. In combination with an airplane having a fuel tank, the latter including a fuel outlet, and a valve controlling said outlet; of means for discharging the fuel from the tank during flight, said means comprising a normally collapsed flexible conically shaped tube carried by the airplane, means for releasing the tube from its collapsed condition during flight, means for causing said tube to assume a circumferentially and longitudinally extended fuel discharging position during flight, said means including a plurality of differently diametered spreaders distributed longitudinally of the tube, and a weight attached to the free end of said tube, additional means in connection with said extending means and coacting with said valve, whereby movement of the tube to extended position opens said valve, and restoration of said tube to its normally collapsed condition causes said valve to close.

5. The combination with an aircraft including a fuel tank, the latter being equipped with a fuel outlet, and a valve controlling said outlet, said outlet being disposed in a recess formed in the aircraft, of means associated with the aircraft and tank for discharging the fuel from said tank during flight, said means comprising a tube normally collapsed within said recess, spreaders of decreasing diameter distributed longitudinally along said tube, the spreader of greatest diameter being situated adjacent the upper end of the tube and the spreader of smaller diameter being positioned adjacent its free end and formed with a spider, means for releasing the tube from the recess during flight, said means including a weight for causing said tube to assume a longitudinal fuel discharging position, means for restoring said tube to said recess, additional means in connection with said restoring means and coacting with said valve, whereby movement of the tube to extended position opens said valve and restoration of the tube to its normally collapsed condition causes said valve to close.

6. In combination with an aircraft including a fuel tank provided with an outlet valve; of means comprising a normally collapsed fuel discharge tube carried by the airplane, means for extending and retracting the tube during flight, and means connecting the tube with said valve, whereby the extension and retraction of said tube effects the opening and closing of said valve.

JULIAN E. RAYMOND.